Figure 1:
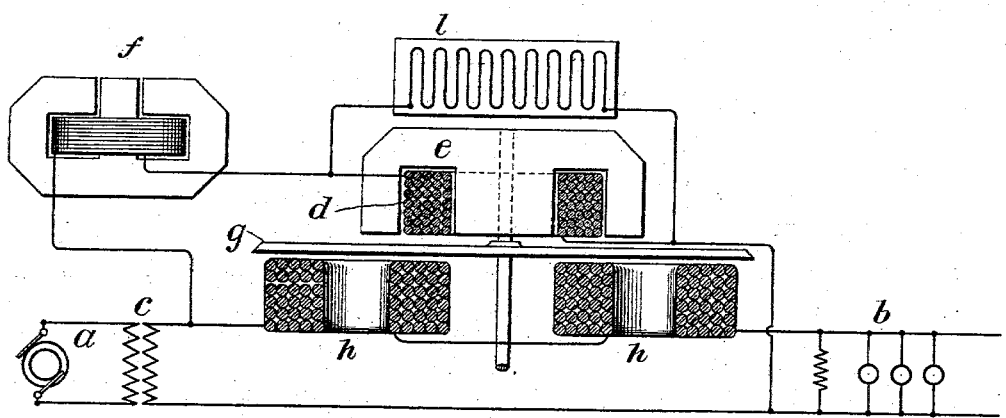

No. 757,516. PATENTED APR. 19, 1904.
E. M. TINGLEY.
PHASE ANGLE ADJUSTING MEANS.
APPLICATION FILED APR. 24, 1900.
NO MODEL.

WITNESSES:
C. L. Belcher
Birney Hines

INVENTOR.
Egbert M. Tingley
BY
Wesley G. Carr
ATTORNEY.

No. 757,516. Patented April 19, 1904.

UNITED STATES PATENT OFFICE.

EGBERT M. TINGLEY, OF PITTSBURG, PENNSYLVANIA, ASSIGNOR TO WESTINGHOUSE ELECTRIC & MANUFACTURING COMPANY, A CORPORATION OF PENNSYLVANIA.

PHASE-ANGLE-ADJUSTING MEANS.

SPECIFICATION forming part of Letters Patent No. 757,516, dated April 19, 1904.

Original application filed May 9, 1896, Serial No. 590,841. Divided and this application filed April 24, 1900. Serial No. 14,175.

(No model.)

*To all whom it may concern:*

Be it known that I, EGBERT M. TINGLEY, a citizen of the United States, residing at Pittsburg, in the county of Allegheny and State of Pennsylvania, have invented a new and useful Improvement in Phase-Angle-Adjusting Means, of which the following is a specification, this application being a division of my application, Serial No. 590,841, filed May 9, 1896.

My invention relates to phase-angle adjustment, and more particularly to the adjustment of the phase angle between the shunt and series fields of instruments employed for measuring the energy consumed by translating devices in alternating-current circuits.

The object of my invention is to provide a means whereby such an adjustment of the phase relation between the magnetic fields of such an instrument may be effected as will insure an accurate indication or registration whatever may be the power factor of the work-circuit.

In alternating-current-measuring instruments, the operation of which is dependent upon a difference in phase between the currents in the two actuating-coils or sets of coils—such, for example, as that shown in Patent No. 531,867, granted to O. B. Shallenberger January 1, 1895—it is necessary to have a phase difference of substantially ninety degrees between the shunt and series fields for a condition of no lag in the main or work circuit in order to secure a correct indication or registration of the true energy in circuits carrying inductive loads having different power factors or in any given circuit the power factor of which is variable. This quadrature relation may be approximated in connection with single-phase circuits by the employment of a properly-designed inductance-coil in the shunt-circuit, as described in the said Shallenberger patent. In order to secure a phase angle of exactly ninety degrees, however, an additional correcting or adjusting means is usually necessary. Such a means is set forth in Patent No. 548,231, granted to O. B. Shallenberger October 22, 1895. It consists of a closed coil secondary located in the field of the main shunt-coil and having its magnetic circuit coincident with that of said shunt-coil, by virtue of which a component is added to the field of the shunt-coil which serves to give the desired phase angle.

I propose to secure the desired phase angle between the shunt and series field when there is no current lag in the work-circuit by displacing the current in the shunt field-coil with reference to that in the series field coil or coils, such displacement being a retardation of a sufficient amount to produce a phase angle of substantially ninety degrees between the current in the shunt-coil and that in the series coil for a condition of no lag in the work-circuit. The means for effecting the desired result comprises a non-inductive shunt to the field coil or coils—*i. e.*, a shunt having a lesser time constant than that of the coil or coils shunted—it being of course understood that the non-inductive resistance included in the shunt will be so proportioned as to cooperate with the main field coil or coils in connection with which it is used.

Figure 2:
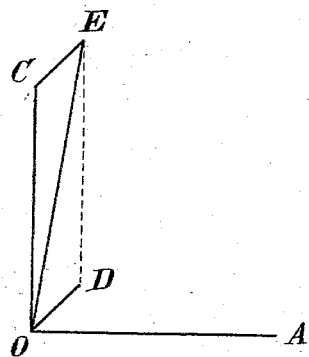

Reference being now had to the accompanying drawings, Figure 1 is a diagram of a single-phase circuit and a wattmeter constructed in accordance with my invention. Fig. 2 is a diagram representing the various currents and phase angles involved in the apparatus illustrated in Fig. 1.

Reference being now had to Fig. 1 of the drawings, *a* is an alternating-current generator for supplying energy to the translating devices *b* either directly or through a transformer *c*. *d* is one of the actuating-coils of the meter provided with a magnetic core *e* and connected across the work-circuit. The circuit of this coil *d* includes an inductance-coil *f* in order to retard the shunt-current with reference to the impressed electromotive force. *g* is the rotatable armature of the meter, which is preferably in the form of a disk, as indicated. *h h* are two coils connected in series in the work-circuit and located on the opposite side of the disk from the coil $d$. While two of these coils are shown, a single coil may be employed, if desired, provided it is properly located with reference to the coil $d$.

The construction thus far described when employed in connection with the necessary registering or indicating and retarding devices is suitable for determining the amount of electrical energy consumed in the work-circuit, provided there is substantially no inductive load on such circuit. It is found to be practically impossible, however, to produce the ninety-degree relation between the impressed electromotive force and the current in the shunt-coil of the meter that is desired in order to secure accurate indication or registration for different inductive loads without the employment of some additional phase-adjusting means. Such a means is shown in Fig. 1 and comprises a non-inductive resistance $l$ in shunt to the coil $d$. The non-inductive shunt $l$ is of such proportions as to provide a component that is leading with reference to the main shunt-current, and it therefore serves to retard the current in the coil $d$ the necessary amount to provide the desired quadrature relation between the said current and that in the series coils $h$, as is indicated diagrammatically in Fig. 2, in which line O A represents at a given instant the current in the series coils of the meter, line O E the main shunt-current, line C E, which is equal and parallel to line O D, the current in the non-inductive shunt $l$, and line O C the current in the shunt-coil of the meter. The angle A O C is the phase angle between the current in the shunt-coil and the current in the series coils, this angle being ninety degrees, as desired, the angle C O E being the angle of compensation. The correct proportions of the coils will obviously depend upon the conditions to be met in any particular case and may readily be determined by any one skilled in the art.

While my invention is illustrated and described in connection with an instrument for measuring electrical energy and is primarily intended for use in such relations, I do not desire or intend to limit the particular apparatus with which it is employed.

I claim as my invention—

1. The combination in an alternating-current circuit, of a field-coil connected in series in said circuit, a second field-coil in shunt upon said circuit, an inductive resistance in series with said second field-coil and a non-inductive resistance in shunt thereto.

2. In an alternating-current meter operated by currents differing in phase and comprising two actuating-coils, means in series with one of said coils for causing the current therein to lag behind its impressed electromotive force approximately ninety degrees and means in shunt to said coil for increasing said angle of lag.

3. The combination with two field-coils and means for lagging the phase of the magnetic field produced by one of them, of means in shunt and in non-inductive relation to said last-named coil for causing a further lag of its magnetic field.

4. The combination with an alternating-current circuit of means for measuring the true energy therein, comprising a coil connected in series with and a coil connected in shunt upon said circuit, an armature actuated by said coils, an inductive resistance in series with said shunt-connected coil and a non-inductive resistance in shunt to said coil.

5. The combination with two field-coils and means for lagging the phase of the current in one of them, of means in shunt to the last-named coil for causing a further lag of its current phase.

6. In a phase-adjusting device, the combination of two field-coils traversed by current, means for lagging the phase of the current of one field-coil and a phase-adjusting means in shunt to the last-named coil for causing a further lag of its current phase.

7. The combination with two field-coils and means for lagging the phase of the magnetic field produced by one of them, of means in shunt to said last-named coil for directly causing a lag of its current phase.

In testimony whereof I have hereunto subscribed my name this 20th day of April, 1900.

EGBERT M. TINGLEY.

Witnesses:
WESLEY G. CARR,
BIRNEY HINES.